Sept. 23, 1969 S. G. PARKER ET AL 3,468,363
METHOD OF PRODUCING HOMOGENEOUS INGOTS OF MERCURY
CADMIUM TELLURIDE
Filed Oct. 10, 1967

INVENTOR
SIDNEY G. PARKER
HERBERT KRAUS
V. Bryan Medlock, Jr.
ATTORNEY

1

3,468,363

METHOD OF PRODUCING HOMOGENEOUS INGOTS OF MERCURY CADMIUM TELLURIDE

Sidney G. Parker, Dallas, and Herbert Kraus, Richardson, Tex., assignors to Texas Instruments Incorporated, Dallas, Texas, a corporation of Delaware Filed Oct. 10, 1967, Ser. No. 674,288
Int. Cl. B22d *27/04;* C22c *7/00, 17/50*
U.S. Cl. 164—125 3 Claims

ABSTRACT OF THE DISCLOSURE

A method of producing homogeneous ingots of mercury cadmium telluride by quenching a quartz ampoule containing a homogeneous mercury cadmium telluride liquid by directing a stream of cool gas against the bottom of the ampoule to cool the liquid to the solid state within less than about 40 seconds while the ampoule is positioned within the furnace used to heat the elemental mercury, cadmium and tellurium to a reaction temperature.

Figures 1, 2:
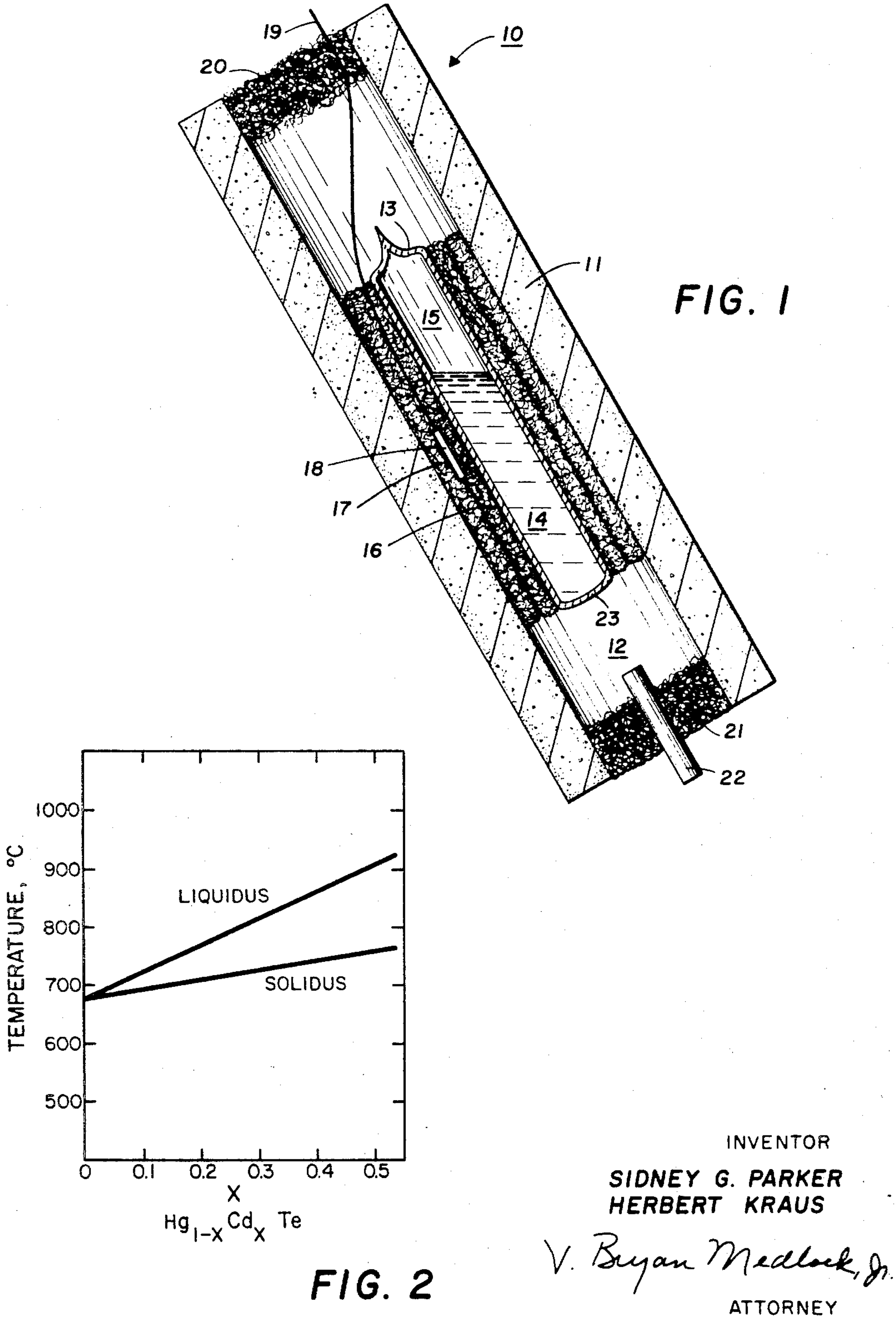

This invention relates to the production of mercury cadmium telluride (Hg, Cd) Te and more particularly to a novel method of producing homogeneous ingots thereof.

Mercury cadmium telluride is a tenary composition which is often described as a pseudo-binary since the mercury and cadmium behave as though they were only one element in combination with the tellurium. This composition is a highly useful material for the manufacture of detectors. The intrinsic bandgap of the material varies with the relative amounts of cadmium and mercury present. Accordingly, by varying the composition of the material, the detectable wavelength of the devices fabricated therefrom can be varied over a considerable range. For example, a 10 micron wavelength detector can be fabricated from $Hg_xCd_{1-x}Te$, where $x$ is about 0.80. However, it is impossible to obtain a significant amount of mercury cadmium telluride having a given composition using known techniques.

Specifically, as pointed out in Kruse, Applied Optics, vol. 4, No. 6, p. 687 (June 1965), one of the conventional techniques for preparing mercury cadmium telluride is to seal the proper portions of the elements in a thick-walled quartz ampoule, which is evacuated to a pressure of $10^{-6}$ torr, and sealed. The ampoule is placed in a conventional rocking furnace and reacted at approximately 800° C. for 24 hours. The ampoule is removed from the rocking furnace, cooled to room temperature, and loaded into a conventional, vertical Bridgman furnace where it is dropped through a steep temperature gradient (approximately 200° C. per centimeter) at the rate of 2 to 3.2 millimeters per hour. As pointed out by the above article, the resulting ingot of mercury cadmium telluride may contain one or several single crystal regions. The slow freezing which the mercury cadmium telluride experiences in being dropped through the temperature gradient of the Bridgman furnace, within which gradient the mercury cadmium telluride will be transformed from the liquid to the solid state, results in $Hg_xCd_{1-x}Te$ of compositions different from that of the "weighed-in" composition. In other words, a concentration gradient will be established from one end of the ampoule to the other due to migration and disassociation of the cadmium, mercury and tellurium during the slow freezing process. Not only will there be a longitudinal concentration gradient, but a radial concentration gradient will develop as well. Thus, if it is desired to remove from the ingot a material having the composition, for example, $Hg_{.80}Cd_{.20}Te$, it is necessary to take cross sections through the ingot at different points along the length, analyze each of these sections until a section having the desired concentration is located. As is obvious, prior art technique of preparing a mercury cadmium telluride having a desired composition results in the waste of a great deal of material. It is not uncommon to find only two relatively thin slices of the ingot suitable for detectors sensitive to a given wavelength from an ingot which should theoretically yield 10,000 of such detectors.

In order to eliminate the problems introduced by the slow freezing of the mercury cadmium telluride by the Bridgman technique, it has been suggested that the ampoule may be removed from the rocking furnace and immediately dropped into a water or ice bath to effect immediate transition of the mercury cadmium telluride from the liquid to the solid state. However, such techniques produce an ingot having from moderate to severe pitting in the core of the ingot. This pitting is believed to be caused by mercury vapor erupting from the liquid into the vapor space above the liquid, as the vapor space above the liquid will cool in the mentioned freezing techniques quicker than the liquid phase causing an imbalance in the equilibrium within the ampoule. The imbalance so created tends to cause the mercury vapor to move from the hotter liquid phase into the cooler vapor phase where it will condense. In fact, close inspection of an ingot produced by the quick freezing technique will reveal liquid mercury dispersed within the pits or cavities formed in the ingot by the freezing process. Since, for detector purposes, the mercury cadmium telluride must be a single crystal material, the pitted material formed in the freezing process is worthless. The present invention may be described as a method for producing mercury cadmium telluride by sealing desired portions of the mercury, cadmium and tellurium in a quartz ampoule large enough to include a vapor space above the mercury, cadmium and tellurium and heating the ampoule to a temperature above the liquidus of the mixture for several hours to permit a homogeneous mercury cadmium telluride liquid to form which includes the improvement of quenching the homogeneous mercury cadmium telluride from the liquidus to the solidus state by directing a cool gas stream against that portion of the ampoule within which the liquid is contained to cool said liquid to the solid state within less than about 40 seconds.

To be more specific, reference is made to the drawings in which:

FIGURE 1 is a somewhat schematic view in cross section of a rocking furnace, and FIGURE 2 is a graph representing the liquidus and solidus lines for a mercury cadmium telluride system with the mole fraction of the cadmium being plotted along the abscissa and the ordinate having temperature of the system in degrees centigrade plotted along its length.

With reference to FIGURE 1, a conventional electrically resistance heated rocking furnace 10 has a fire-brick wall 11 which defines a cylindrical chamber 12 within which is positioned a quartz ampoule 13. Ampoule 13 contains a mixture 14 of mercury cadmium telluride above which is a vapor space 15. The ampoule 13 is wrapped with two separate layers 16 and 17 of quartz wool between which is positioned a thermocouple 18. Conductors 19 of thermocouple 18 pass through the top end of rocking furnace 10 for attachment to a conventional temperature read-out device. The top end of furnace 12 has a plug of quartz wool 20 tightly packed therein to retain heat within chamber 12, and the lower end is also provided with a plug 21 of quartz wool which is packed around a stainless steel conduit 22 one end of which opens toward the bottom 23 of ampoule 12. The apparatus illustrated in FIGURE 1 may be used to carry out the method of the present invention, as is detailed in the following examples.

Example I

An approximately 10-inch long quartz ampoule having an ID of 8 mm. and an OD of 12 mm. is first washed with an Alconox and ammonium hydroxide solution and then etched in a conventional manner by rinsing the ampoule with chemical polish No. 4 etching solution (known to those skilled in the art as CP–4 etch solution). After being treated with the CP–4 solution, the ampoule was then rinsed first with deionized water which was followed by a distilled water rinse. After being rinsed with distilled water, the ampoule was vacuum fired and placed in a glove box which contained a nitrogen atmosphere. In the glove box, the ampoule was loaded with 7.5108 grams mercury, 1.2264 grams cadmium and 6.2581 grams tellurium. Once loaded, the ampoule was evacuated to a residual pressure of $3\times10^{-5}$ torr, sealed off with a hydrogen and oxygen torch and wrapped with two layers of quartz wool between which a thermocouple was placed, as illustrated in FIGURE 1. The ampoule was then positioned within a rocking furnace having a 25 mm. ID, such as illustrated in FIGURE 1. The conductors from the thermocouple, after being taken through the top end of the furnace, was connected to a suitable temperature read-out device and the upper end of the furnace packed with quartz wool, as illustrated in FIGURE 1. The bottom end of the furnace, also as illustrated in FIGURE 1, was provided with a quartz wool pack around a stainless steel tube having an ID of approximately 5 mm. The tip of the tube was positioned approximately one inch from the bottom of the ampoule, as illustrated in FIGURE 1. The rocking furnace was raised to a temperature of 809° C.–810° C. and the furnace was rocked for a 24-hour period, in a conventional manner.

At the end of the 24-hour period during which the mercury, cadmium and tellurium were maintained in the liquid state to permit reaction between the components to form a homogeneous liquid mixture, the furnace was stopped and the plug at the upper end of the furnace removed. Essentially simultaneously, the current used to heat the furnace was cut off and nitrogen was introduced through the stainless steel tube under a pressure of 6.25 pounds per square inch. The nitrogen was, of course, directed at the bottom 23 of ampoule 13. After striking the bottom 23 of ampoule 13, the nitrogen circulated around the sides of ampoule 13 through quartz wool layers 17 and 18 and exited through the upper end of furnace 10. The mercury cadmium telluride was quenched from the liquid to the solid state in approximately 25 seconds. Once quenched to the solid state, the ampoule was removed, and the ingot removed from the ampoule. The ingot was placed in a larger quartz ampoule within which it was annealed at 650° C. for two weeks in a mercury vapor, all of which is conventional. After annealing, the ingot was cross-sectioned randomly and the sections subjected to an electron-microprobe analysis. It was found that the composition of the ingot over the 9 mm. length sampled was of essentially uniform composition. Specifically, maximum percent deviation from the mercury concentration was .6%, the maximum deviation in the cadmium concentration was .4% and the maximum deviation in the tellurium concentration was .6%. These deviations are to be contrasted with materials produced by the Bridgman technique which yield across a 12 mm. distance along the diameter of a single slice mercury deviations of 3%, cadmium deviations of 3% and tellurium deviations of 17%.

Example II

The procedures of Example I was followed, except the following quantities of the starting materials were used: Hg—7.9230 gms.; Cd—1.1802 gms.; and Te—6.4693 gms. The temperature of the rocking furnace was maintained between 805° C. and 809° C. for a 24-hour period following which the ampoule subjected to a blast of nitrogen from the stainless steel tube resulted in quenching of the mercury cadmium tellurium liquidus to a solidus state in 25 seconds. The ingot was removed from the compounding ampoule and transferred to a 13 mm. ID by 19 mm. OD quartz ampoule and annealed for two weeks at 640° C. in a mercury vapor. The ingot produced by the annealing process had some large single crystals. A sample was cut from the ingot and annealed at 300° C. under a partial mercury vapor pressure of 150 torr for one hour. The mode of the detector signal was in the PV mode, and the spectral peak was at 10 microns.

Example III

The process of Example I was repeated, except the following quantities reacting materials were used: Hg—8.0244 gms.; Cd—1.1236 gms.; and Te—6.4698 gms. The rocking furnace was maintained at 801° C. for 24 hours, following which the ampoule was cooled with a nitrogen blast from 801° C. to 700° C. in 12 seconds. At 700° C., the mercury cadmium telluride liquid was quenched to the solid state. The ingot was removed from the compounding ampoule and one-half the ingot was annealed at 640° C. for two weeks in a mercury environment, in the manner described in Example II. Several randomly cut slices from either end of the ingot were annealed for one hour at 300° C. under a mercury vapor of 150 mm. A p-n junction was created in each of the slices, and all slices showed spectral peak responses at or about 12 microns with a $D^*_{BB}$ (500,850,1) of $1\times10^8$ cm. cps.$^{1/2}$ watt $^{-1}$, thus evidencing that the material throughout the length of the ingot was of essentially uniform composition.

As will be obvious from consideration of the above examples, the present invention provides a method of producing homogeneous ingots of mercury cadmium telluride which are completely devoid of any pitting or cavities greatly reducing the expense of producing mercury cadmium telluride of desired composition for the purpose of detecting infrared rays of a given wavelength.

While rather specific terms have been used in describing several embodiments of the invention, they are not intended, nor should they be construed, as limitations upon the invention as defined by the claims.

What is claimed is:

1. In a method of producing mercury cadmium telluride by sealing desired portions of mercury, cadmium and tellurium in a quartz ampoule large enough to include a vapor space about the mercury, cadmium and tellurium and heating the ampoule to a temperature above the liquidus of the mixture for several hours to permit a homogeneous mercury cadmium telluride liquid to form, the improvement comprising:

quenching said homogeneous mercury cadmium telluride from the liquid to the solid state by directing a cool gas stream against that portion of the ampoule within which the liquid is contained to cool said liquid to the solidus state within less than about 40 seconds.

2. The method of claim 1, wherein said ampoule is elongated with a vapor space being present in one end thereof and the liquid being contained with the other end, and said cool gas stream is directed against said other end.

3. The method of claim 1, wherein said ampoule is elongated and positioned within the elongated chamber of a rocking furnace to heat the contents thereof to a homogeneous mixture, and said cooling gas is directed against the bottom of said ampoule to cool the liquid in said ampoule before substantial cooling of the vapor in the vapor space above the liquid.

References Cited

UNITED STATES PATENTS

| | | | |
|---|---|---|---|
| 3,218,204 | 11/1965 | Ruehrwein | 148—175 |
| 3,312,571 | 4/1967 | Ruehrwein | 148—175 |
| 3,318,669 | 5/1967 | Folberth | 23—315 |
| 3,335,084 | 8/1967 | Hall | 252—62.3 |

OTHER REFERENCES

Applied Optics, Kruse, vol. 4, No. 6, p. 687 (June 1965).

J. SPENCER OVERHOLSER, Primary Examiner

V. RISING, Assistant Examiner

U.S. Cl. X.R.

23—315; 75—135, 151, 169; 252—62.3, 501